Jan. 27, 1970  M. KASPARIAN, JR  3,491,600
THREE-AXIS ACCELERATION MEASURING MEANS
Filed April 6, 1965  2 Sheets-Sheet 1
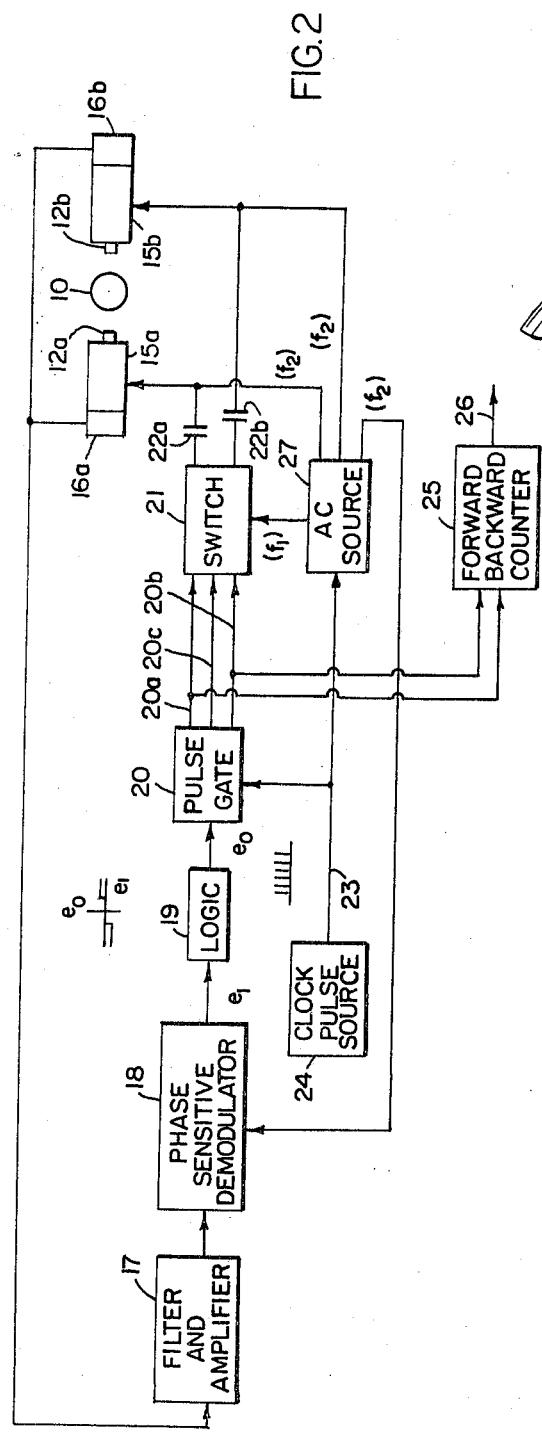
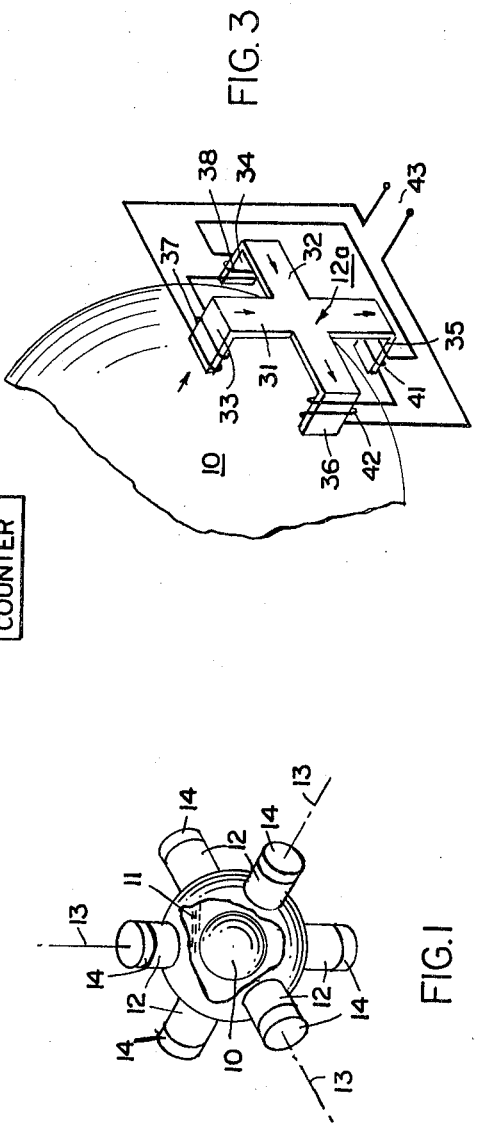
INVENTOR
MALCOLM KASPARIAN JR.
BY,
Wolf, Greenfield & Hieken
ATTORNEYS United States Patent Office 3,491,600
Patented Jan. 27, 1970

3,491,600
THREE-AXIS ACCELERATION MEASURING MEANS
Malcolm Kasparian, Jr., 9 Homeland Ave., Saugus, Mass. 01906
Filed Apr. 6, 1965, Ser. No. 445,946
Int. Cl. G01p 7/00, 15/08
U.S. Cl. 73—503                            12 Claims

ABSTRACT OF THE DISCLOSURE

The acceleration measuring system includes an inertial mass element immersed in a damping fluid and surrounded by six force generators. These force generators are electromechanical transducers which impart a force to the inertial mass element. Two force generators are mounted on each of the three mutually perpendicular axes of the inertial element. There are also three signal generators, which may be structurally a part of the force generator, there being one signal generator for each of the three mutually perpendicular axes. The force generators respond to signals representative of the displacement of the inertial element from normal reference position provided by the signal generators to generate forces tending to restore the inertial element to its normal reference position. By applying constant energy pulses to the force generators and noting the difference betwen the number of pulses applied to one generator of an axis pair and the other force generator of that pair to keep the inertial element centered, an indication of the acceleration component along that axis is obtained.

The present invention relates in general to measuring acceleration simultaneously along three mutually perpendicular axes, and more particularly concerns a new and improved accelerometer designed to measure acceleration along three mutually perpendicular axes simultaneously with but a single mass element and provide signals in digital form suitable for use in inertial guidance systems.

Accelerometers of various types are presently known for use in inertial guidance systems. Most of these accelerometers measure acceleration only along a single axis. Therefore, many inertial guidance systems which use single axis accelerometers require the mounting of three such accelerometers with their acceleration sensitive axes aligned mutually perpendicular. The accelerometers are often mounted, along with the system gyro units, on an attitude stabilized platform. Three single axis accelerometer units are disadvantageous because of the size and weight for this stabilized platform. Also, the more complicated mountings required to attach three accelerometers to the stabilized platform and the assembly problems of alignment of the three accelerometers with their sensitive axes mutually perpendicular to within acceptable tolerances present serious problems.

The desire to increase the application of inertial systems in the field of guidance and control of terrestial and space vehicles place requirements of greater sensitivity and operational accuracy on the system accelerometers. In a single axis accelerometer design the inertial mass element commonly is constrained along the two axes which are perpendicular to the sensitive axis by applied mechanical, electric field, or magnetic field forces. The cross-axis supporting means is one of the important contributing factors determining the sensitivity of the accelerometer. In a three-axis single-mass-element accelerometer design the inertial mass element is not subjected to the sensitivity reduction caused by force producing elements whose sole function is to serve as the cross-axis support.

A known means of measuring acceleration simultaneously in three mutually perpendicular directions with a single mass element includes means for supporting a mass in an electric or magnetic field or with stressed wire strings which have the effect of producing an elastic restraining force on the mass element. Acceleration information is obtained by measuring the amount of displacement of the mass element from its null position. Non-linearities in the elastic restraining force and inaccuracies resulting from the measurement of the small magnitude of displacements of the mass element results in significant errors, especially if an analog signal proportional to the displacement is the output being measured.

It is an important object of the present invention to provide a new and improved means of measuring acceleration simultaneously along three mutually perpendicular axes.

Further objects of the invention are:
(a) To provide a three-axis acceleration measurement system capable of achieving a realizable sensitivity beyond that of present conventional single-axis instruments.
(b) To provide with a single instrument a means of acceleration measurement along three mutually perpendicular axes with digital readout of the acceleration information in the form of integral of acceleration; that is, velocity.
(c) To provide a three-axis acceleration measurement device that, compared with three conventional accelerometers of comparable accuracy, is
   (1) less expensive
   (2) smaller
   (3) lighter
(d) To provide with a single device measurement of acceleration along three mutually perpendicular axes, and thereby, simplify instrument mountings for three axis measurement of acceleration.
(e) To provide three-axis long-term continuous monitoring of acceleration without deterioration of accelerometer performance due to mechanical wear.

According to the invention, an inertial element having mass and responsive to an electrical energy field by coacting therewith to receive positioning forces therefrom is supported by means for establishing an electrical field having three independently controllable orthogonal components for supporting the inertial element in a predetermined normal reference position with the element being relatively movable in all directions with respect to the reference position when in the reference position. Means responsive to displacement of the element from the reference position alters the orthogonal components so as to lessen the displacement of the element from the reference position. Means provide three output signals, each representative of the intensity of a respective one of the orthogonal components. Preferably, the means for establishing the three orthogonal components of an electrical energy field comprises three opposed pairs of magnetic pole faces with each pair of faces aligned along a respective one of three orthogonal axes, a plurality of force generation windings each associated with a respective one of the pole faces, and means for alternately applying electrical energy to the force generation windings associated with a pair of pole faces during mutually exclusive time intervals so that a respective winding of a pair receives energy causing the displacement of the element toward the normal reference position until slightly overshooting the position closest to the normal reference position. The three output signals are preferably each representative of the difference in electrical energy applied to the pair of force generation windings associated with the associated pair of pole faces.

In a preferred form of the invention the means for alternately applying electrical energy comprises means for providing a train of energy pulses, and means responsive to the train of energy pulses for alternately applying electrical energy to one and the other windings of a pair of force generation windings associated with a pair of pole faces. Means count the difference between the number of pulses causing energy to be applied to one winding and those causing energy to be applied to the other winding associated with an opposed pole face to provide respective ones of the output signals in digital form.

Numerous other features, objects and advantages of the invention will become apparent from the following specification when raed in connection with the accompanying drawing in which:

FIG. 1 is a simplified perspective view of the constructional features of an embodiment of the invention herein contemplated;

FIG. 2 is a block diagram illustrating the logical arrangement of one of the three identical control loops in an exemplary system for three-axis measurement of acceleration according to the invention;

FIG. 3 is a simplified perspective view of the signal and force generator unit illustrating by way of example, a possible mechanical configuration;

Figure 4:
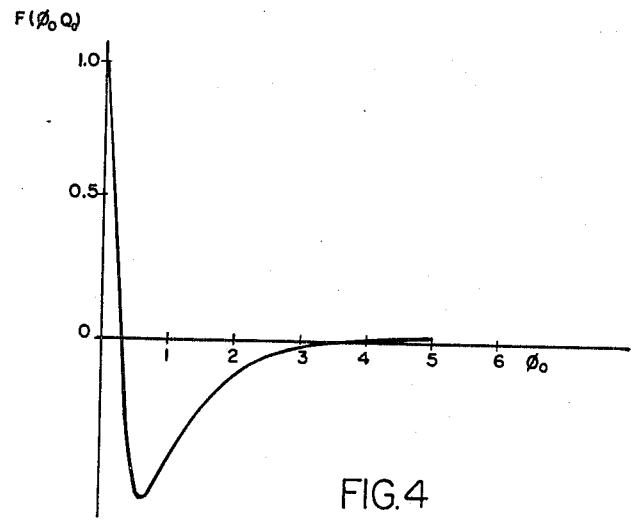
Figure 5:
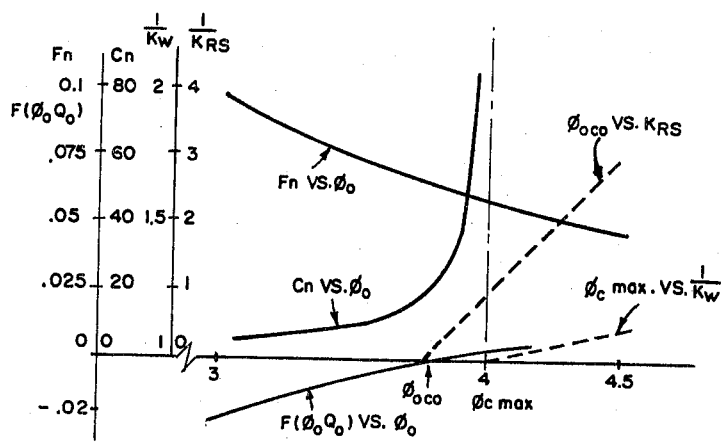

FIG. 4 is a graph indicating the variation in negative restraint force of the force generator as a function of a defined parameter $\phi_0$ helpful in understanding the principle of operation of the force generator; and FIG. 5 shows normalized plots of the force generator restraint force and output force and tuning capacitor value which will be helpful in understanding principles of the present invention.

In the description of the drawings similar reference numerals refer to similar parts. Referring to the drawings for an explanation of the invention contemplated, there is first shown in FIG. 1 the inertial mass element 10, immersed in a damping fluid 11, and surrounded by six force generators 12, hereafter sometimes abbreviated as FG. The force generators are electromechanical transducers which impart a force to the inertial mass element 10. Two force generators are mounted on each of the three mutually perpendicular axes 13. In addition, there are three signal generators 14, hereafter sometimes abbreviated as SG, which may be srtucturally part of the FG. There is one SG 14 for each of the three mutually perpendicular axes. The force generators respond to signals representative of the displacement of the inertial element 10 from normal reference position provided by the signal generators to generate forces tending to restore element 10 to its normal reference position.

Referring to FIG. 2, there is shown the logical arrangement of an electronic control loop associated with each of the three axes of the device. Since the three electronic loops are similar, only one such loop is shown in the basic block diagram of FIG. 2.

The signal generators 16A and 16B provide a signal to amplifier and filter 17 respresentative of the displacement of inertial element 10 from the midpoint of the axis joining pole faces 12A and 12B. This amplified displacement signal is demodulated by the phase sensitive demodulator 18 and applied to the logic circuitry 19. The output of the logic circuitry 19 serves as an input to pulse gate 20 to gate through clock pulses 23, from clock pulse source 24, on line 20A, 20B or 20C.

If the inertial element is within a prescribed region (as set by width of the dead zone of logic 19) centered at the midpoint between pole faces 12A and 12B, the clock pulses are gated on output line 20C to cause switch 21 to block all energy from the A-C source 27 from reaching the windings of force generators 15A and 15B which are associated with pole force 12A and 12B.

If inertial element 10 is closer to pole face 12B than to pole face 12A, the clock pulses are gated on output line 20A to cause switch 21 to provide energy from A-C source 27 through capacitor 22A to the winding of force generator 15A associated with pole face 12A to draw the spherical inertial element 10 closer to pole face 12A until inertial element 10 etiher comes within the prescribed dead zone region of the logic 19 or slightly overshoots the dead zone region centered midway between the two pole faces. This slight overshoot condition is sensed by the signal generators 16 which provide a characteristic signal that is amplified by amplifier-filter 17 and causes logic circuitry 19 to pass the clock pulses 23 to output line 20B which in turn causes switch 21 to couple A-C source 27 through capacitor 22B to the winding of force generator 15B associated with pole face 12B and thereby draw inertial element 10 back toward that pole face.

The switch 21 thus applies energy from A-C source 27 through 22A until line 20B or 20C receives clock pulses, at which time source 27 is connected by switch 21 to either deliver energy through capacitor 22B or disconnect the source 27 from the windings of both force generators 15A and 15B.

Similarly energy is delivered through capacitor 22B until clock pulses again commence being delivered by pulse gate 20 to output line 20A or 20C. Since the clock pulses 23 occur at regular intervals, the difference in the number of clock pulses provided on line 20A and those provided on 20B is representative of the difference in energy provided by pole face 12A and that provided by pole face 12B necessary to keep inertial element 10 essentially midway therebetween. Consequently, this clock pulse difference is an indication of the inertial force acting on element 10 in a direction along the axis between pole faces 12A and 12B. Reversible counter 25 has its "forward" input connected to line 20B and its "backward" input connected to line 20A so that output line 26 provides a signal in digital form representative of this difference.

As explained above, the SG excitation is synchronized with the clock pulse rate. The SG frequency $f_2$ is preferably greater than the FG A-C frequency $f_1$. Control line 23 controls the A-C source 27 so that both the frequencies $f_1$ and $f_2$ are synchronized. The lines designated $f_2$ to the FG and to the phase sensitive demodulator 18 are the high frequency lines for sensing of displacement.

Specific techniques for detecting the deviation of element 10 from its position midway between pole faces 12A and 12B are well known in the art. For example, a magnetic field signal generator may be used as explained later. The logic circuitry 19 might comprise a pair of Zener diodes with a fixed breakdown voltage such that only a voltage with an absolute magnitude of some fixed value is conducted through to the pulse gate circuitry 20. The pulse gate may be a pair of "AND" gates jointly energized by the clock pulses source 24 and respectively energized by a signal provided by the logic circuitry 19. Switch 21 might comprise a pair of flip-flops, one pair having its set input energized from line 20A and its reset input energized from line 20B and 20C while the other one of the pair having its set input energized from line 20B and its reset input energized from lines 20A and 20C, a conducting one of the flip-flop transistors effectively connecting A-C source 27 to one of capacitors 22A and 22B.

A feature of the invention resides in the fact that the output count provided on line 26 is proportional to the integral of the acceleration of inertial element 10 along the axis between pole face 12A and 12B so that the output signal provides velocity directly without further processing in digital or hybrid computers. Since each of the control loops provides an output signal representative of a respective orthogonal component of velocity, the three signals completely specify a vector representation of the velocity of vehicle carrying the inertial element 10, assuming that the vehicle started from rest and the count in each counter was then zero.

An electrostatic analogy of the magnetic device described above is also contemplated within the invention. The magnetic type of force generator and signal generator may be replaced by a capacity type of FG and SG which would use an electric field to produce the necessary force on the inertial mass element and produce the position pick-off signal.

Referring again to FIG. 1 the mode of operation will be discussed. The forces acting on inertial mass element 10 includes force generator forces; buoyancy and damping forces of the medium 11 surrounding the mass element 10, and centripetal, tangential and Coriolis forces from any angular rotation of the accelerometer case. The motion of the mass element due to these forces is expressed approximately by the vector equation:

$$\bar{F}_{FG} = M_{fm}\dot{\bar{V}}_{Ic} + M_m\dot{\bar{V}}_{cm} - B\dot{\bar{r}}_{cm} + M_m 2\bar{W}\times\dot{\bar{r}}_{cm} + M_{fm}\dot{\bar{W}} \times \bar{r}_{cm} + M_{fm}\bar{W}\times(\bar{W}\times\bar{r}_{cm}) \quad (1)$$

where the terms are defined following Equation 2.

Integrating the previous Equation 1 from time 0 to $t_k$ with zero initial conditions and equating the indicated velocity $V_{ind}$ as proportional to the summation of discrete velocity increments of magnitude $F_{FG}t_s/M_{fm}$ gives the basic equation of the device:

$$\bar{V}_{ind} = (F_{FG}t_s/M_{fm})\sum_{n=0}^{k-1} \pm \bar{1}_n = \bar{V}_{Ic}(t_k) + (M_m/M_{fm})\bar{V}_{cm}(t_k)$$
$$- (B/M_{fm})\bar{r}_{cm}(t_k) + (2M_m/M_{fm})\int_0^{t_k} \bar{W}\times\dot{\bar{r}}_{cm}(t)dt$$
$$+ \int_0^{t_k} [\dot{\bar{W}}\times\bar{r}_{cm}(t) + \bar{W}\times(\bar{W}\times\bar{r}_{cm}(t))]dt + \bar{E} \quad (2)$$

$\bar{V}_{ind}$ = indicated velocity
$\bar{V}_{Ic}$ = actual velocity
$\bar{V}_{cm}$ = mass element velocity respect to case
$M_m$ = mass of inertial mass element
$M_{fm}$ = mass difference between $M_m$ and mass of fluid displaced by mass element
B = damping of fluid medium
$\bar{F}_{FG}$ = force generator force
$\bar{r}_{cm}$ = mass element displacement with respect to case
$\bar{W}$ = angular velocity of instrument case with respect to inertial space
$\bar{E}$ = component errors
$t_s$ = time interval between switching clock pulses
$\bar{1}_n$ = vectorial sum of pulses on three axes at the $n$th interval of time $t_s$.

The stored velocity error and angular velocity error are kept to a minimum by having the device operate in a low mode of limit cycle oscillation characteristic of nonlinear systems. The acceleration measuring system herein described is nonlinear due to the logic circuitry 19 (FIG. 2). The exact nature of the limit cycle oscillation is influenced by the type of logic circuitry used. The logic circuitry may comprise a two-state device; that is, a device producing either a positive or a negative single valued output depending upon which side of null (normal reference positon) the mass element 10 is located at the time that a switching clock pulse occurs. Preferably, the logic circuitry may comprise a three-state device by incorporating in the previously described two-state device a dead zone, such that if the mass element is within a region centered on null, no output from the logic circuitry is obtained. The exact type of logic, magnitude of the mass element, damping from the surrounding medium, and loop gain is preferably chosen to minimize the amplitude of the limit cycle oscillations in accordance with techniques well known to those skilled in the art.

The present invention incorporates a contemplated force generator which has a constant output force regardless of the small positional changes of the inertial mass element. Referring now to FIG. 3 the view of an exemplary force generator FG combined with a signal generator SG is shown in simple constructional form in order to facilitate an explanation of its electrical operation. It is understood that the mechanical configuration of the force generator FG and the signal generator SG can be modified within the scope of the invention.

Pole face 12A is seen to comprise a magnetic member with a vertical element 3 intersecting a horizontal element 32 along the axis which passes through the center of spherical inertial element 10 and a similar point of intersection in pole face 12B with each of the cross arms 31 and 32 terminating in coil supporting elements 33, 34, 35 and 36 perpendicular to cross arms 31 and 32 and extending inwardly toward the inertial element 10. The force generator winding associated with that pole piece comprises four segments 37, 38, 41 and 42 connected in series aiding relationship when energized through input terminals 43, from means including capacitor 22B.

Pole face 12A my also include a secondary winding wound identically the same way as the primary, comprising an SG signal generator 16 for providing the error signal representative of the position of inertial element 10. By superimposing a high frequency signal generator excitation signal on the signal applied between terminals 43 of much smaller amplitude and of higher frequency than the force generator A-C signal provided by A-C source 27, the tuning conditions of the force generator are avoided, and the signal generator signal contributes a negligible amount to total output force of the force generator while being of a frequency readily discriminated for purposes of detecting positional information. It is preferred that this signal generator excitation signal be synchronized with the clock pulse rate to insure that the average output force provided by signal generator excitation signal during each clock pulse interval is essentially constant. The two output windings of two signal generators on the same axis of the accelerometer may then be connected in series to provide a phase sensitive output with null corresponding to the center position of the inertial mass element 10.

Referring now to the graph in FIG. 4, the variation in the output force of the force generator with a small displacement of the mass element 10 from its null position, hereafter referred to as the negative restraint force, is illustrated in the graph to be a function of a parameter defined as:

$$\phi_0 = \frac{1}{R_T}\left(\omega L_T - \frac{1}{\omega C}\right) \quad (3)$$

where the terms are defined following Equation 4.

The mathematical expression for this negative restraint force, $F(\phi_0, Q_0)$ is given by the expression $$F(\phi_0, Q_0) = \frac{\Delta F}{\Delta x}\bigg|_{x=0} = \frac{[\phi_0^2 - \phi_0 Q_{oT}k_W + 1 - k_{RS}]}{(1+\phi_0^2)^2} \quad (4)$$

$$Q_{oT} = \frac{\omega L_T(x)}{R_T(x)}\bigg|_{x=0}$$

$\omega$ = frequency of A-C source 27

$L_T$ = total inductance of force generator primary winding $R_T$ = total resistance including A-C loss effective resistance of force generator primary circuit $$k_w = \frac{\text{Inductance of FG primary not including effect of magnetic flux leakage}}{\text{Total inductance of FG primary including magnetic flux leakage}}$$

$$k_{RS} = \frac{\Delta R_T}{R_T}\frac{1}{x/g_o}$$

$$x/g_o = \frac{\text{displacement of mass element}}{\text{maximum mass element displacement possible}}$$

The desired operating condition is when the negative restraint force $F(\phi_o, Q_o)$ crosses the horizontal axis of the graph. Two such crossover points occur and the second point is preferably chosen because of its relatively smaller crossover slope, and is labeled as $\phi_{o,co}$ on the graph.

Referring now to FIG. 5 an expanded portion of the normalized restrain force $F(\phi_o, Q_o)$ normalized output force, and normalized tuning capacitor value is plotted as a function of $\phi_o$ near the desired operating point $\phi_{o,co}$. These curves are drawn for an ideal magnetic structure. For an actual non-ideal magnetic structure the crossover value $\phi_{o,co}$ and maximum value $\phi_{o'max}$ for a finite value of capacitance to exist will vary as shown by the dashed curves. One of the dashed curves indicates the change in the crossover point $\phi_{o,co}$ with the previously defined proportionality constant, $k_{RS}$, which gives a measure of the change in effective electrical resistance with displacement of the mass element. The other dashed curve gives the variation of the $\phi_{cmax}$ value with the proportionately constant $1/k_w$ which is a measure of the magnetic flux leakage.

Through proper choice of magnetic material for and constructional design of the magnetic structure and operating conditions to establish operation of the force generator at the crossover point $\phi_{o,co}$ a relatively contant output force is obtained regardless of the small positional change of the mass element.

Although the present invention has been described and illustrated with certain embodiments, it is to be understood that the same is by way of illustration and example only and that modification and variations may be made without departing from the spirit and scope of the invention. Such modifications and variations are considered to be within the purview and scope of the invention and appended claims.

What is claimed is:

1. Acceleration sensitive apparatus comprising,
an element having mass and responsive to an intermittently applied A-C energy field of predetermined fixed frequency by coacting therewith to receive positioning forces therefrom,
means for establishing said intermittently applied A-C energy field of predetermined fixed frequency having three independently controllable orthogonal components for supporting said element in a predetermined normal reference position with said element being relatively movable in all directions with respect to said reference position when in said reference position,
said means for establishing including said element and characterized by an impedance that varies with a change in position of said element from said reference position and by parameter values,
means responsive to displacement of said element from said reference position for altering said orthogonal components so as to lessen the displacement of said element from said reference position with said parameter values and said fixed frequency being related so as to maintain a substantially constant force upon said element along the direction of each of said orthogonal components then present,
and means for providing three output signals each representative of the intensity of a respective one of said orthogonal components.

2. Acceleration sensitive apparatus in accordance with claim 1 wherein said means for establishing three orthogonal components of an electrical energy field comprises three opposed pairs of magnetic pole faces with each pair of faces aligned along a respective one of three orthogonal axes,
a plurality of force generation windings each associated with a respective one of said pole faces,
means for alternately applying electrical energy to the force generation windings associated with a pair of pole faces during mutually exclusive time intervals so that a respective winding of a pair receives energy causing the displacement of said element toward said normal reference position until slightly overshooting the position closest to said normal reference position,
said three output signals each being representative of the difference in electrical energy applied to a pair of force generation windings associated with a pair of pole faces.

3. Acceleration sensitive apparatus in accordance with claim 2 wherein said means for alternately applying electrical energy comprises,
means for providing a train of energy pulses,
means for applying the train of energy pulses alternately to one and the other windings of a pair of force generation windings associated with a pair of pole faces,
and means for counting the difference between the number of said pulses applied to said one winding and those applied to said other winding to provide respective ones of said output signals.

4. Acceleration sensitive apparatus in accordance with claim 3 wherein said means for providing a train of energy pulses comprises,
a source of a fixed frequency A-C power signal.
means for rectangularly modulating said fixed frequency A-C power signal to provide said train of energy pulses,
said means for applying the train of energy pulses alternately to one and the other windings comprising a series combination of a resistor and capacitor in series with each of the latter two windings respectively,
the values of said resistors, said capacitors and the impedance of said winding coacting to establish the static operating point of the negative restraint force exerted by said means for establishing said electrical energy field upon said element as substantially zero.

5. Acceleration sensitive apparatus in accordance with claim 4 and further comprising,
a plurality of signal generation windings each associated with a respective one of said pole faces,
a source of a fixed frequency A-C signal generator signal of higher frequency and lower amplitude than that of said A-C power signal,
a source of clock pulses,
means for synchronizing said signal generator signal and rectangular modulation of said power signal in response to said clock pulses,
means for exciting said signal generation windings with said signal generator signal,
means responsive to said signal generator signal and the signals developed across said signal generation windings for providing an error signal representative of the displacement of said element from said reference position,
and means for coupling said error signal to said means responsive to displacement of said element from said reference position.

6. Acceleration sensitive apparatus in accordance with claim 5 wherein each of said means for providing three output signals comprises,
a forward-backward counter,
and logical circuitry means for selectively gating said clock pulses to said forward-backward counter to selectively advance and retard the count therein so that the instantaneous count is representative of the integral of acceleration of said element along a respective axis.

7. Acceleration measuring apparatus comprising a mass element, means for establishing an electrical energy field for normally positioning said element in a normal reference position, means responsive to the position of said reference element for providing an error signal representative of the deviation of said element from said reference position, said means for establishing comprising means for altering the orientation of said electrical energy-field in response to said error signal to urge said element toward said reference position and maintain a substantially constant force upon said element, a source of clock pulses, counting means responsive to said clock pulses for providing a count signal representative of the orientation of said electrical energy field over a previous time interval that is long compared to the time interval between successive clock pulses, and gating means responsive to the occurrence of each alteration in the orientation of said electrical field for selectively controlling the advancing and retarding of the count in said counting means to provide said count signal.

8. Acceleration sensitive apparatus in accordance with claim 7 wherein said means for establishing an electrical energy field comprises force generation winding means and means for applying electrical energy to said force generation winding means to reverse the orientation of said electrical energy field during mutually exclusive time intervals to cause displacement of said element toward said reference position until slightly overshooting the position closest to said reference positon, said means for applying electrical energy comprising a source of a train of energy pulses and comprising a source of a fixed frequency A-C power signal, means for rectangularly modulating said fixed frequency A-C power signal to provide said train of energy pulses, a series combination of resistive means and capacitive means in series with said winding means, the parameter values of said resistive means, said capacitive means and the impedance of said winding means coacting to establish the static operating point of the negative restraint force exerted by said means for establishing said electrical energy field upon said element as substantially zero.

9. Acceleration sensitive apparatus in accordance with claim 8 and further comprising, signal generation winding means magnetically coupled to said element and said force generation winding means, a source of a fixed frequency A-C signal generator signal of higher frequency and lower amplitude than that of said A-C power signal, means for synchronizing said signal generator signal in response to said clock pulses, means for synchronizing the rectangular modulation of said power signal so that a change in the modulation envelope occurs only simultaneously with the occurrence of a clock pulses, means for exciting said signal generation winding means with said signal generator signal, and means responsive to said signal generator signal and a signal provided by said signal generation winding means for providing said error signal representative of the displacement of said element from said reference position.

10. Acceleration sensitive apparatus in accordance with claim 9 wherein said counting means comprises a forward-backward counter and further comprising, logical circuitry means for selectively gating said clock pulses to said forward-backward counter to selectively advance and retard the count therein so that the instantaneous count is representative of a component of the integral of acceleration of said element.

11. Force generation apparatus comprising, a mass element, means for establishing an electrical energy field for normally positioning said element in a normal reference position, means responsive to the position of said reference element for providing an error signal representative of the deviation of said element from said reference position, said means for establishing comprising means for altering the orientation of said electrical energy field in response to said error signal to urge said element toward said reference position, said means for establishing comprising force generation winding means, means for applying electrical energy to said force generation winding means to reverse the orientation of said electrical energy field during mutually exclusive time intervals to cause displacement of said element toward said reference position until slightly overshooting the position closest to said reference position, said means for applying electrical energy comprising a source of a train of energy pulses and comprising a source of a fixed frequency A-C power signal, said means for applying including means for rectangularly modulating said fixed frequency A-C power signal to provide said train of energy pulses, a series combination of resistive means and capacitive means in series with said winding means, said fixed frequency being related to the parameter values of said resistive means, said capacitive means and the impedance of said winding means to establish the static operating point of the negative restraint force exerted by said means for establishing said electrical energy field upon said element as substantially zero.

12. Force generation apparatus comprising, a mass element, means including force generation winding means for establishing an electrical energy field for normally positioning said element in a normal reference position, means for applying electrical energy to said force generation winding means to establish said electrical energy field, said means for applying electrical energy comprising a source of a fixed frequency A-C power signal providing said signal to said force generation winding means through the series combination of resistive means and capacitive means, said fixed frequency being related to the parameter values of said resistive means, said capacitive means and the impedance of said winding means to establish the static operating point of the negative restraint force upon said element exerted by said means for establishing said electrical energy field as substantially zero.

References Cited

UNITED STATES PATENTS

| 2,919,583 | 1/1960 | Parker. | |
| 2,943,493 | 7/1960 | Bosch et al. | 73—503 |
| 3,028,550 | 4/1962 | Naydan et al. | |
| 3,204,466 | 9/1965 | Henderson | 73—503 |
| 3,221,563 | 12/1965 | Wing | 73—517 XR |
| 3,261,210 | 7/1966 | Buchhold | 73—517 |

JAMES J. GILL, Primary Examiner

U.S. Cl. X.R.

73—517